United States Patent
Godshaw et al.

(10) Patent No.: US 7,232,961 B1
(45) Date of Patent: Jun. 19, 2007

(54) PORTABLE HAND HELD LUGGAGE WEIGHT AND SIZE MEASUREMENT DEVICE

(75) Inventors: Donald E. Godshaw, Evanston, IL (US); Brad Schantz, Evanston, IL (US); Zoran Gracer, Deerfield, IL (US)

(73) Assignee: Travel Caddy, Inc., Elk Grove Village, IL (US)

( * ) Notice: Subject to any disclaimer, the term of this patent is extended or adjusted under 35 U.S.C. 154(b) by 0 days.

(21) Appl. No.: 11/556,009

(22) Filed: Nov. 2, 2006

(51) Int. Cl.
*G01G 23/28* (2006.01)
*G01G 3/00* (2006.01)

(52) U.S. Cl. .................. 177/131; 177/148; 116/293; 116/DIG. 32

(58) Field of Classification Search ............ 177/131, 177/148, 149; 116/293, DIG. 32
See application file for complete search history.

(56) References Cited

U.S. PATENT DOCUMENTS

| | | | | |
|---|---|---|---|---|
| 2,518,973 A * | 8/1950 | Atherton | ...... | 190/102 |
| 2,531,124 A * | 11/1950 | Hart | ...... | 116/293 |
| 2,549,190 A * | 4/1951 | Gilchrist | ...... | 116/293 |
| 2,710,083 A * | 6/1955 | William | ...... | 190/102 |
| 2,759,577 A * | 8/1956 | William | ...... | 190/102 |
| 2,937,016 A * | 5/1960 | Westman | ...... | 177/156 |
| 2,995,106 A * | 8/1961 | Granada | ...... | 116/293 |
| 3,090,454 A * | 5/1963 | Farrar et al. | ...... | 177/131 |
| 4,107,996 A * | 8/1978 | Hollingsworth et al. | ...... | 73/300 |
| 4,936,399 A * | 6/1990 | Christman et al. | ...... | 177/210 C |
| 5,922,999 A * | 7/1999 | Yang | ...... | 177/148 |
| 6,608,261 B2 * | 8/2003 | Thadani | ...... | 177/126 |
| 7,173,187 B2 * | 2/2007 | Triantopoulos et al. | ...... | 174/84 C |
| 2006/0065448 A1 * | 3/2006 | Hudson | | |
| 2006/0207850 A1 * | 9/2006 | Lewis | | |
| 2007/0007048 A1 * | 1/2007 | Gill | | |

OTHER PUBLICATIONS www.alibaba.com, Hanging Scale, pp. 1-3.
www.alibaba.com, Luggage Scale, pp.1-2.
www.magellans.com, Travel Utility Scale, pp. 1-2.
www.radioshack.com, Travelpro Luggage Scale, pp. 1-2.
www.sportys.com, Luggage Scale, p. 103.
www.alibaba.com, Fishing Scale, pp. 1-2.
www.alibaba.com, Handing Fishing Scale, pp. 1-2.
www.magellans.com, 75 lb. Luggage Scale, pp. 1-2.

* cited by examiner

*Primary Examiner*—Randy W. Gibson
(74) *Attorney, Agent, or Firm*—Banner & Witcoff, Ltd.

(57) ABSTRACT

A portable hand held device for weighing and measuring the size of a luggage item includes a handle designed to provide support yet comfort with respect to the use of the weighing device and further includes a mechanism which enables recordal of the weight of luggage placed upon a suspension hook of the device.

1 Claim, 7 Drawing Sheets

FIG.1
FIG.2
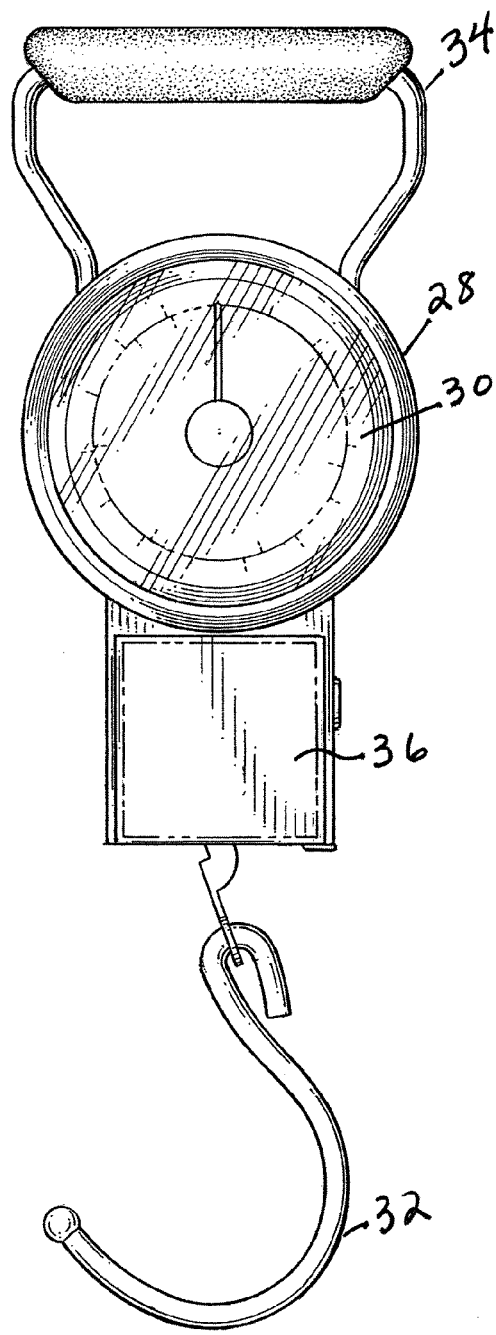
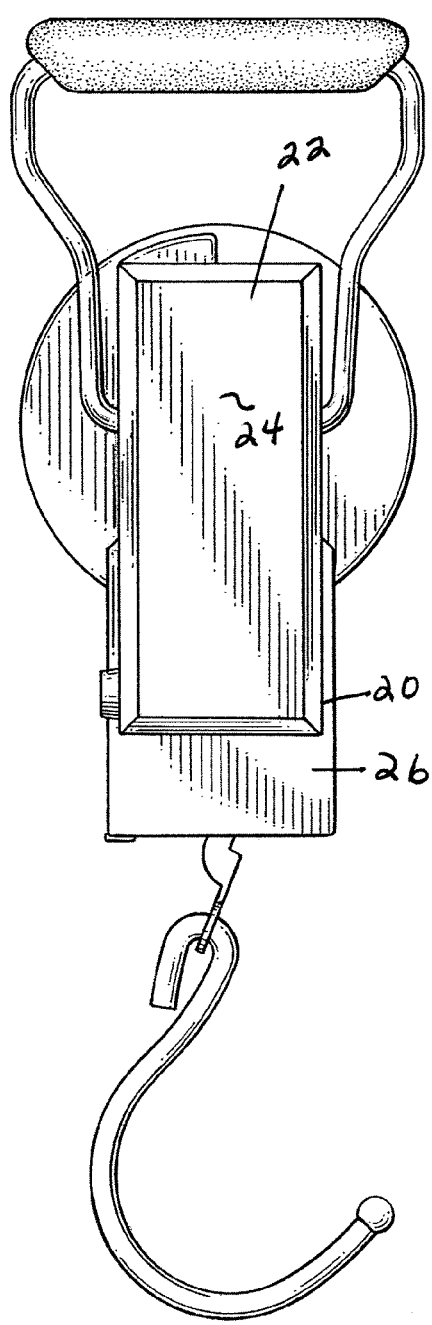

PORTABLE HAND HELD LUGGAGE WEIGHT AND SIZE MEASUREMENT DEVICE

BACKGROUND OF THE INVENTION

In a principal aspect, the present invention relates to a portable hand held device for measuring the size of and weighing luggage items.

With the advent of numerous restrictions relating to travel, and in particular, the items which a traveler can carry on airlines, it is necessary to not only be cautious about items which are being packed for purposes of travel, but also the size and weight of luggage items. Airline carriers have imposed numerous restrictions which are enforced with increasing rigor. Failure to adhere to such restrictions often leads to additional service charges and other penalties.

As a consequence, most airline check in facilities include apparatus for weighing luggage and measuring luggage. The airline consumer or customer, however, does not have the benefit of necessarily knowing the weight or size of a particular item of luggage prior to arrival at an airport. Thus, the customer or consumer is at somewhat of a disadvantage in efforts to comply with travel restrictions.

In an effort to resolve this difficulty, various devices have been proposed for the purpose of measuring the size of and weighing luggage items. A device for weighing and measuring a luggage item has been available, comprising a mechanism which will allow suspension of the luggage from a hook that is mechanically connected to a read out mechanism or dial indicating the weight of the luggage. A tape measure is also attached to such the device and may be utilized to measure the length, width and height of the various luggage items that are capable of being weighed by the same device.

While such a prior art device has been very useful, difficulties remain associated with such a device. In particular, the prior art device did not include a handle design which would facilitate ease of use. Additionally, such a prior art device required the user of the device to engage in some form of contortion in order to view not only the weight sensed by the device, while at the same time attempting to suspend or hold an item of luggage by means of the hook of the weight measuring device. Thus, the construction of such prior art devices, though useful, does not necessarily meet all the needs of the traveling consumer.

SUMMARY OF THE INVENTION

Briefly, the present invention comprises a portable hand held device for measuring the size and weighing of luggage items. The device is an improvement to prior art constructions which included a dial associated with a mechanical linkage that caused the dial to rotate in response to placement of a load on a hook suspended at the lower end or beneath the device. Also positioned at the lower end of the device beneath the dial face is a tape housing with a tape measure therein. A hook is thus suspended from the device and is designed to engage a handle or some other portion of a luggage item to enable weighing of the item.

The invention relates specifically to the handle support of the measuring and weight determination device and to a weight sensing and recordal feature of the device. That is, a handle with a generally polymeric grip section is incorporated on the mid section of a wire rod that connects to a housing for the device. The handle is sized and configured to enhance comfort during use while at the same time providing a means to secure a proper orientation of the device when in use.

As an additional improved feature, the dial face incorporates a second dial or pointer, which may be engaged by the main pointer or indicator that moves in response to weight. The second pointer or dial element is rotatable in conjunction with the first dial element or pointer and has an associated detent feature which retains the second pointer at a position indicating the measured weight of an item suspended on the hook. In this manner, a person using the weight measurement device may easily support the luggage item on the hook, knowing that there will be a "read out" or remaining indication of the weight of the luggage item after that item has been removed from the device. The detent mechanism retains the second or read out dial in the position caused by rotation of the first read out dial or pointer. The second pointer or dial may then be rotated from the detent position back to the original zero set position by engaging a manual button positioned axially on the read out faceplate or dial.

Thus, it is an object of the invention to provide an improved portable hand held device for weighing and measuring the size of luggage items, and in particular, a device which provides various improvements to enhance the ability to grip and support the device and to provide a way to read out or record the weight measured by the device after luggage has been weighed and removed from the device.

Another object of the invention is to provide a compact yet rugged and user friendly weighing and measuring device for luggage items.

These and other objects, advantages and features of the invention will be set forth in the detailed description which follows.

BRIEF DESCRIPTION OF THE DRAWING

In the detailed description that follows, reference will be made to the drawing comprised of the following figures:

FIG. 1 is a front elevation of an embodiment of the weighing and measuring device;

FIG. 2 is a rear elevation of the embodiment of FIG. 1;

DESCRIPTION OF THE PREFERRED EMBODIMENT

Figure 3:
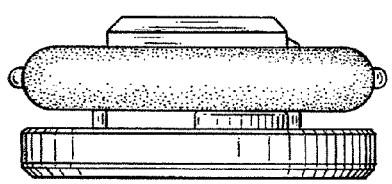
FIG. 3 is a top plan view of the embodiment of FIG. 1.
Figure 4:
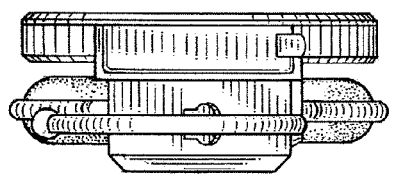
FIG. 4 is a bottom plan view of the embodiment of FIG. 1.
Figure 5:
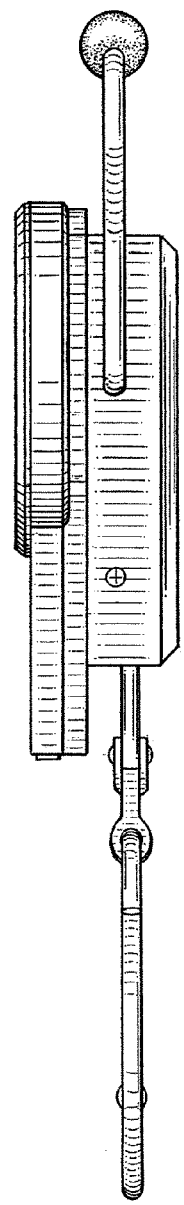
FIG. 5 is a side elevation of the embodiment of FIG. 1.
Figure 6:
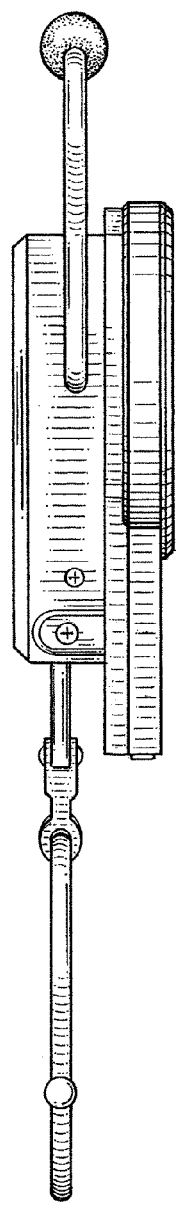
FIG. 6 is an opposite side elevation of the embodiment of FIG. 1.
Figure 7:
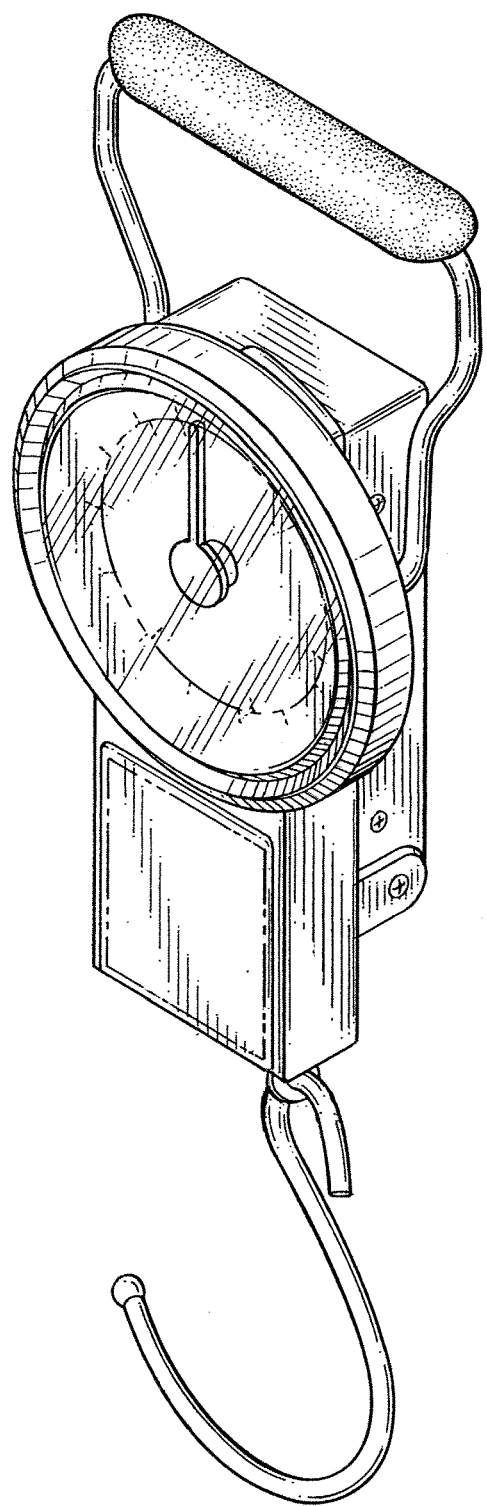
FIG. 7 is an isometric view of the embodiment of FIG. 1.

Referring to the figures, the hand held device for weighing and measuring the size of luggage items includes a housing 20 which may be molded from a polymeric material. The housing 20 includes a generally upper end 22, a back side plate 24 that may be removed from the generally rectangular parallelepiped housing 20 and a lower end 26. A dial face 30 and dial face housing 28 are molded and incorporated with the housing 20. The transparent dial face 30 is positioned over the dial face housing 28. A luggage support hook 32 is suspended beneath the lower end 26 of the housing 20. A manual handle 34 is affixed to the housing 20 as described in greater detail below. A tape measure housing 36 is affixed to the lower end 26 of the housing 20.

FIGS. 8–16 illustrate in greater detail the specific construction of the component parts of the device. Referring to those figures and in particular, FIG. 8, there is illustrated the basic parallelepiped housing 20 with a compressible spring 40 mounted therein and attached to a rack 42. A mechanical linkage joins the hook 32 by means of a connector link 34 to a rod 36 that passes through the center of the spring 40 and effects compression of the spring 40 upon placement of weight upon the hook 32. The rod 36 fits through a bracket 46 that in turn includes a projecting tab 48 fitted into the rack 42. As the rack 42 is moved downwardly in response to weight placed on the hook 32, a pinion 50 mounted in a plate 52, will rotate, thereby rotating a first dial or pointer 54. The entire mechanism is retained in housing 20 by means of cover 24.

Figure 8:
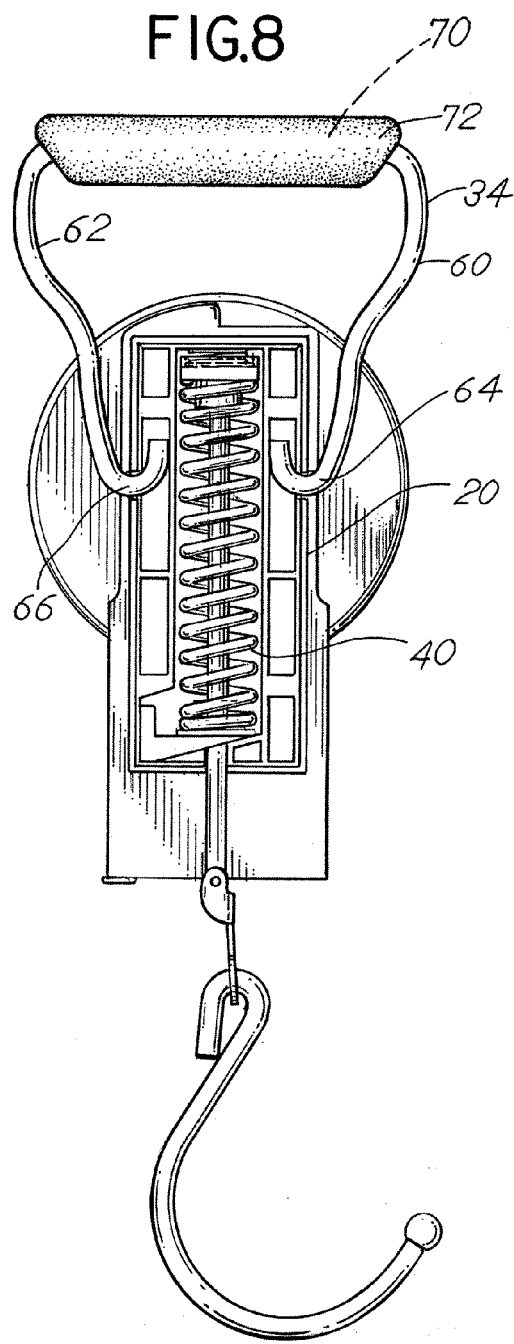
FIG. 8 is a back side elevation of the embodiment of FIG. 1 depicting the mechanism for weighing wherein the back plate of the device has been removed.
Figure 9:
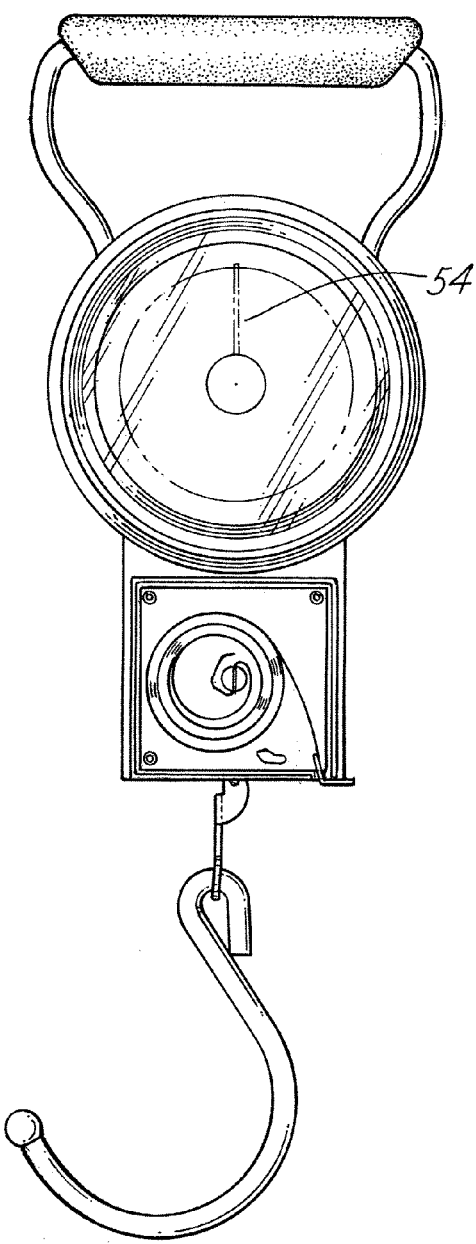
FIG. 9 is a front elevation of the embodiment of FIG. 1 wherein the measuring device and the weighing mechanism associated therewith is exposed inasmuch as the facing plate for the measuring device has been removed.
Figure 10:
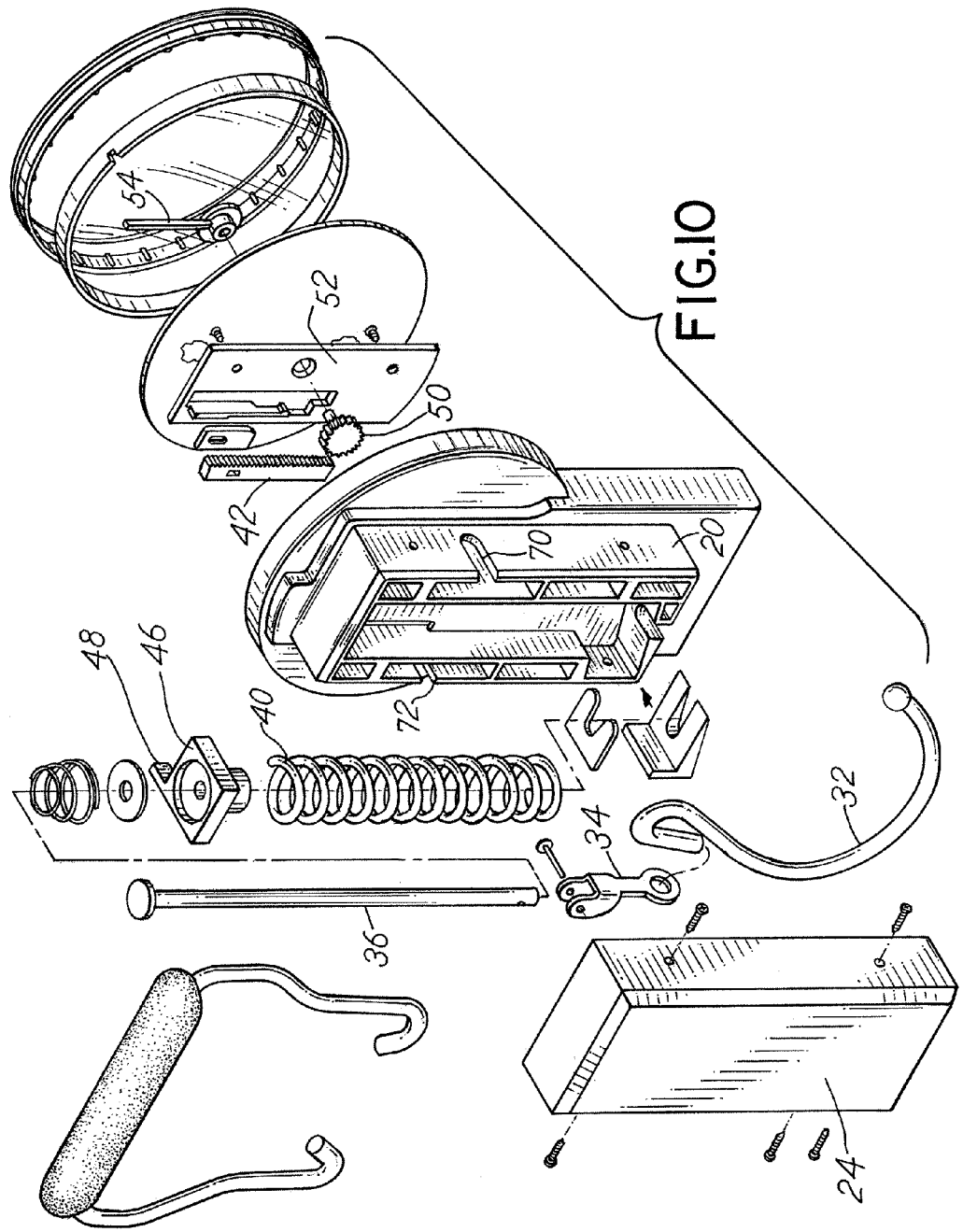
FIG. 10 is an exploded isometric view of the embodiment of FIG. 1.

As shown in greater detail in FIG. 8, the device is supportable by means of a handle 34. The handle 34 includes a first leg 60 and a spaced second leg 62. Leg 60 includes a gripping end section 64. Similarly, the second leg 62 includes a gripping section 66. The sections 64 and 66 fit through slots 70 and 72, respectively, in the side of the housing 20. The handle 34 is retained within the slots 70, 72 by means of the cover 24. The handle 34 is fashioned from a rod material, preferably a steel rod material, which is configured so that the handle 34 will include a generally straight rod, mid or central section 70 having the diameter of the rod legs 60 and 62 with a molded polymeric grip 72 fitted thereon. Preferably, the diameter of the rod 34 is one third that of the polymeric grip 72. Thus, the polymeric grip 72 is generally cylindrical in shape for ease of gripping and comfort and has a diameter of at least about three times greater than that of the support rod or handle 34. It is to be noted that the rod 34 is generally cylindrical and fitted into the slots 70 and 72 as described so that the handle 34 may be pivoted relative to the housing 20 in order to more easily engage, grip and hold luggage items having various configurations and weights.

Figure 11:
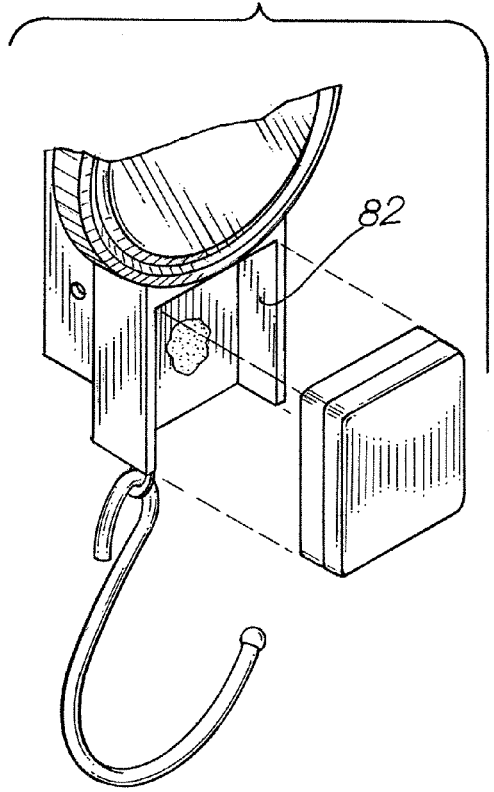
FIG. 11 is a partially exploded isometric view of the tape measure feature of the embodiment of FIG. 1.
Figure 12:
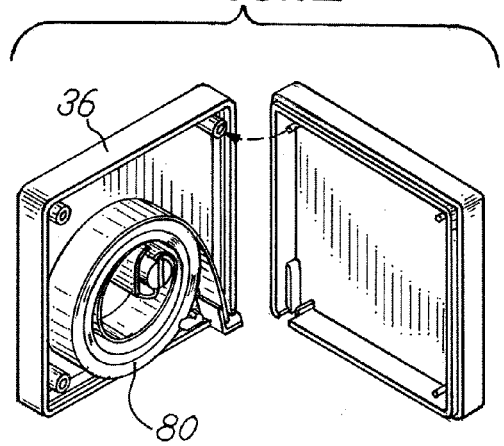
FIG. 12 is a partial, exploded, isometric view of the tape measure feature of the embodiment of FIG. 1.

As shown in FIGS. 11 and 12, the tape housing 36 includes a tape measure 80. The tape housing 36 is positioned in a shaped molded recessed region 82 on the front face of the housing 20. Note that the tape housing 36 may be replaced in the event that there is a failure in the mechanism associated with the tape.

Figure 13:
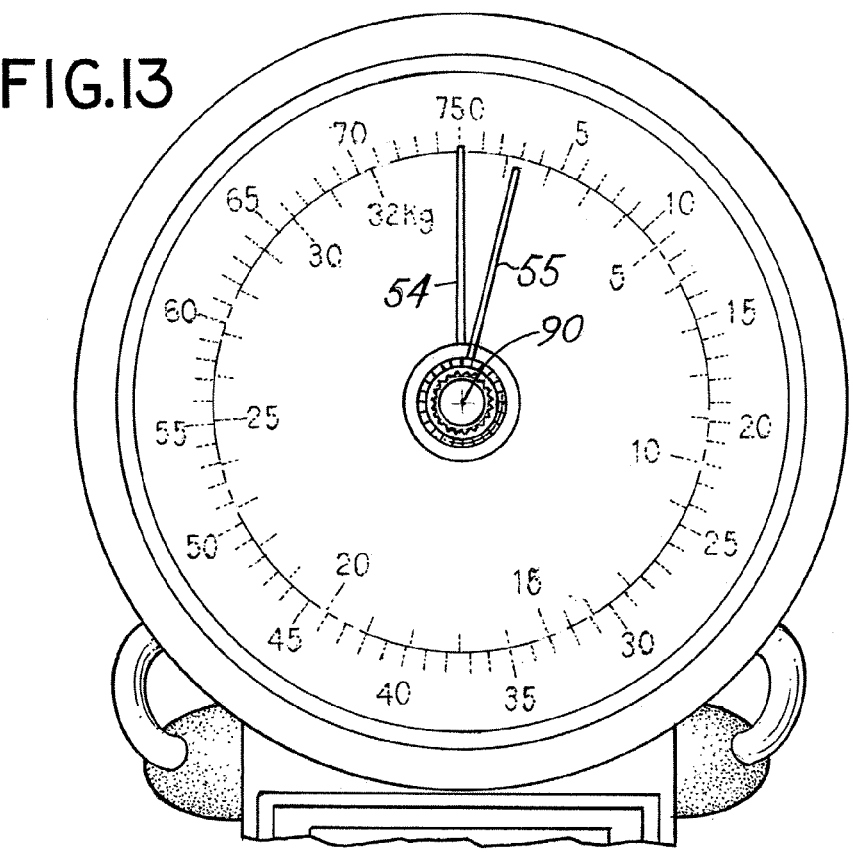
FIG. 13 is a front elevation of the face and dials associated with the embodiment of FIG. 1.
Figure 14:
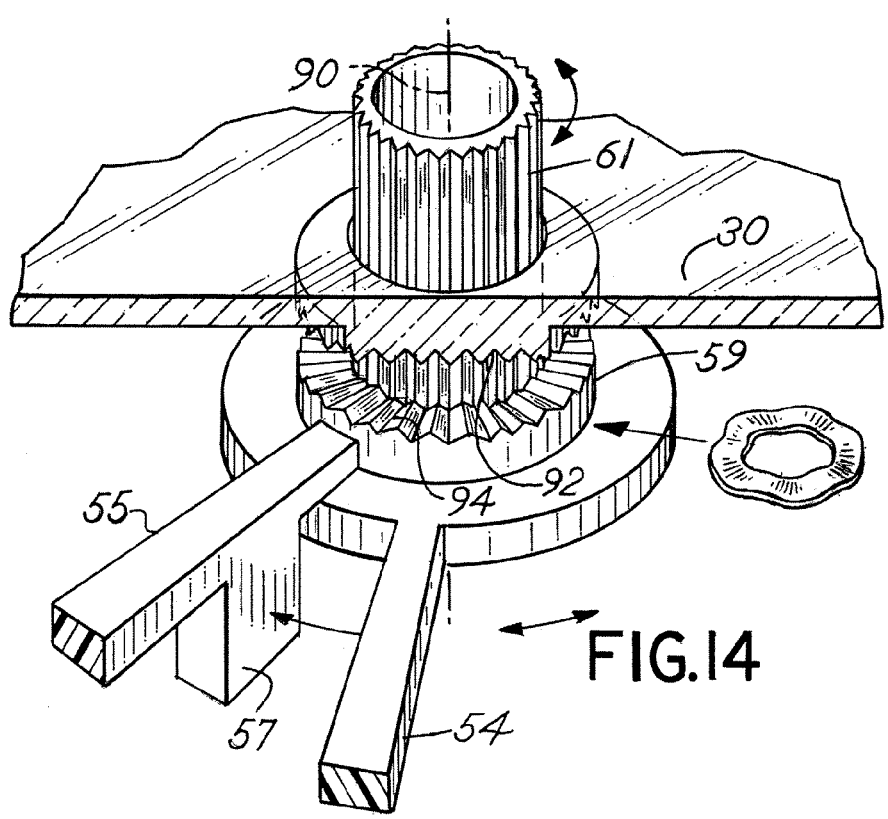
FIG. 14 is an isometric view depicting the construction of the dials associated with the dial face of FIG. 13.

FIGS. 13 and 14 represent an important feature of the invention. Referring to those figures, the first dial 54 which is driven by means of the rack and pinion mechanism previously described is movable about an axis 90. Coaxial with the first dial 54 is a second dial 55 also mounted for rotation about axis 90. The second dial or second pointer, 55, includes a downwardly depending tab 57. That is, the second dial or pointer 55 is mounted on a rotatable annular ring member 59 which includes an outwardly extending manual knob 61 that projects outwardly from the faceplate 30 or through a central opening in the faceplate 30. Thus, the pointers, or dial members 54 and 55 are each rotable about the axis 90.

The faceplate 30 includes a downwardly depending detent tooth arrangement 92 which engages with detent slots 94 in the annular ring 59. Thus, as the pointer 55 is rotated about the axis 90, the engagement of the detent 92 with the slots 94 will tend to hold the pointer 55 in a fixed position. The first pointer 54 will thus rotate for example, in the direction of the arrow in FIG. 14, thereby engaging the depending tab or projection 57 and causing the pointers 54 and 55 to rotate simultaneously about the axis 90. The pointer 54 is rotated in response to placement of weight on the hook 32. Thus, upon release of the weight on the hook 32, the pointer 54 will return to its zero set position as depicted in FIG. 13, whereas the second pointer or second member 55 will remain in a detent position, as illustrated in FIG. 13. The second dial or pointer 55 may however, be manually rotated to again engage or be positioned to engage the first pointer 54 by engagement of the manual collate or projecting member 61. Thus, the position of the second dial or pointer 55 may be re-set so that the weight of the luggage on the hook can again be recorded upon placement of an additional luggage item on the hook.

In sum therefore, the use of dual pointers 54 and 55 in combination with a reset mechanism enables the effective recording of the weight placed on the hook, even after the luggage item or weight on that hook has been removed. It also enables resetting of the dial to weigh an additional device.

Figure 16:
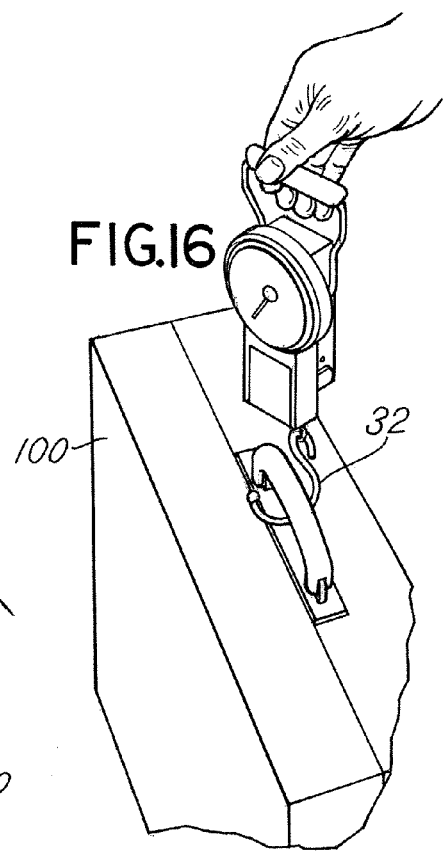
FIG. 16 is an isometric view further illustrating the method of use of an embodiment of the invention to weigh a luggage item.
Figure 15:
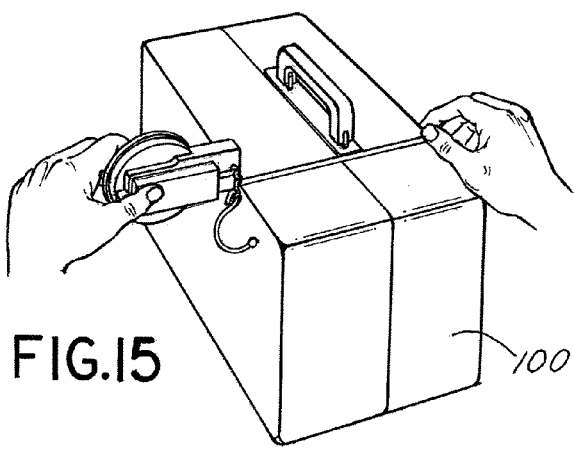
FIG. 15 is an isometric view illustrating the method of use of the device.

FIGS. 15 and 16 illustrate the manner of use of the device. As shown in FIG. 15, the tape is used to measure the dimensions of a luggage item 100. As shown in FIG. 16, the luggage item 100 may be supported on the hook 32 and the weight indicated on the dial 54 with a second dial 55 retained in position, even after the luggage item 100 has been removed. This enables the user of such a device to avoid holding the luggage item in a very uncomfortable manner in order to read the dial while at the same time attempting to lift the luggage and obtain a reading indicating the weight of the item.

While there has been set forth a preferred embodiment of the invention, it is to be understood that the invention is limited only by the following claims and equivalents thereof.

What is claimed is:

1. In a portable, hand held device for weighing and measuring the size of luggage items;
   said device including a housing having a spring actuated rotary dial, said spring supported in said housing and attached to a rack that engages a pinion of said rotary dial, said rack movable in response to compression of said spring to effect rotary movement of a first read out hand of said dial about an axis and thereby register on a face of said dial weight correlated to the load on said spring, said rack connected to a luggage support hook suspended externally of said housing;

said housing an upper and a lower end, and including a sub-housing attached thereto having a measuring tape therein, said sub-housing positioned on said housing adjacent said support hook at the lower end of said housing and beneath said dial face, said housing including a manual grip handle attached to the upper end, the improvement comprising:

a wire rod grip handle with a generally straight connecting run joined to a first and a second depending leg attached respectively to opposite sides of said connecting run and to said housing upper end, said grip handle further including a substantially straight manual polymeric grip on said straight connecting run, connecting the first and second depending legs and said grip having a diameter at least three times the diameter of the wire rod legs; and a second hand pivotal coaxially with said first hand and including a tab for engaging the first hand upon rotation of said first hand about its axis in a first rotational sense, said second hand further including a retention detent for maintaining the second hand in a non-rotational position, said second hand further including a manually engagement reset button to over ride the retention detent and permit rotation of the second hand by manual turning about said axis, whereby the first dial and second dial will move simultaneously in response to weight suspended on said hook, said first dial returnable to a zero set position upon removal of the weight as said second dial remains in a detent position representative of the weight suspended on the hook.

* * * * *

UNITED STATES PATENT AND TRADEMARK OFFICE
CERTIFICATE OF CORRECTION

| | | |
|---|---|---|
| PATENT NO. | : 7,232,961 B1 | Page 1 of 1 |
| APPLICATION NO. | : 11/556009 | |
| DATED | : June 19, 2007 | |
| INVENTOR(S) | : Donald E. Goshaw et al. | |

It is certified that error appears in the above-identified patent and that said Letters Patent is hereby corrected as shown below:

In the Claims:

Column 5, line 1, in claim 1, "said housing an upper and lower end" should be changed and corrected to read --said housing having an upper and lower end--.

Column 6, lines 9, 10, 11, and 13, in claim 1, each occurrence of "dial" should be changed and corrected to read --hand--.

Signed and Sealed this
Seventeenth Day of March, 2015

Michelle K. Lee
*Director of the United States Patent and Trademark Office*